United States Patent [19]

Bradley et al.

[11] Patent Number: 5,138,939
[45] Date of Patent: Aug. 18, 1992

[54] SMOKER APPARATUS

[76] Inventors: Robin Bradley, 12180 Vickers Way, Richmond, B.C., Canada, V6V 1H9; Miroslav Harcuba, 1481 Franklin Street, Vancouver, British Columbia, Canada, V5L 1P1; Joseph E. Bradley, 12180 Vickers Way, Richmond, British Columbia, Canada, V6V 1H9

[21] Appl. No.: 529,812

[22] Filed: May 29, 1990

Related U.S. Application Data

[63] Continuation-in-part of Ser. No. 214,049, Jun. 30, 1988, abandoned.

[51] Int. Cl.⁵ ............................................. A23B 4/04
[52] U.S. Cl. .................................... 99/482; 99/467; 126/59.5; 126/73; 221/15; 221/129
[58] Field of Search ............... 99/448, 450, 467, 340, 99/476, 481, 482, 483, 485, 646 R; 126/59.5, 73, 74; 110/234; 122/15; 136 R; 221/15, 106, 107, 152, 120, 129, 266

[56] References Cited

U.S. PATENT DOCUMENTS

| | | | |
|---|---|---|---|
| 1,447,401 | 3/1923 | Alsop | 99/482 |
| 2,425,870 | 8/1947 | Dixon | 221/266 |
| 2,515,455 | 7/1950 | Lipton | 126/59.5 |
| 2,578,545 | 12/1951 | Haase et al. | 221/107 |
| 2,677,038 | 4/1954 | Reynoldson | 99/482 |
| 2,781,039 | 2/1957 | Kaiser et al. | 126/74 |
| 3,228,554 | 1/1966 | Huffman | 221/152 |
| 4,151,930 | 5/1979 | Baker et al. | 221/129 |
| 4,175,484 | 11/1979 | Tobey | 99/482 |
| 4,309,965 | 1/1982 | Hill | 122/15 |
| 4,540,107 | 9/1985 | Davidson | 221/266 |

Primary Examiner—Timothy F. Simone

[57] ABSTRACT

Smoke generating apparatus has a heater provided in a housing defining a heating chamber, and a slide member movable to and fro for displacing briquettes in a stepped motion onto the heater in succession from the bottom of the stack of such briquettes, so that each briquette is consumed progressively in successive portions at successive time intervals. The slide member is displaced by a mechanism including a pawl and ratchet mechanism which is adjustable to vary the rate of advance of the briquettes to the heater.

5 Claims, 7 Drawing Sheets

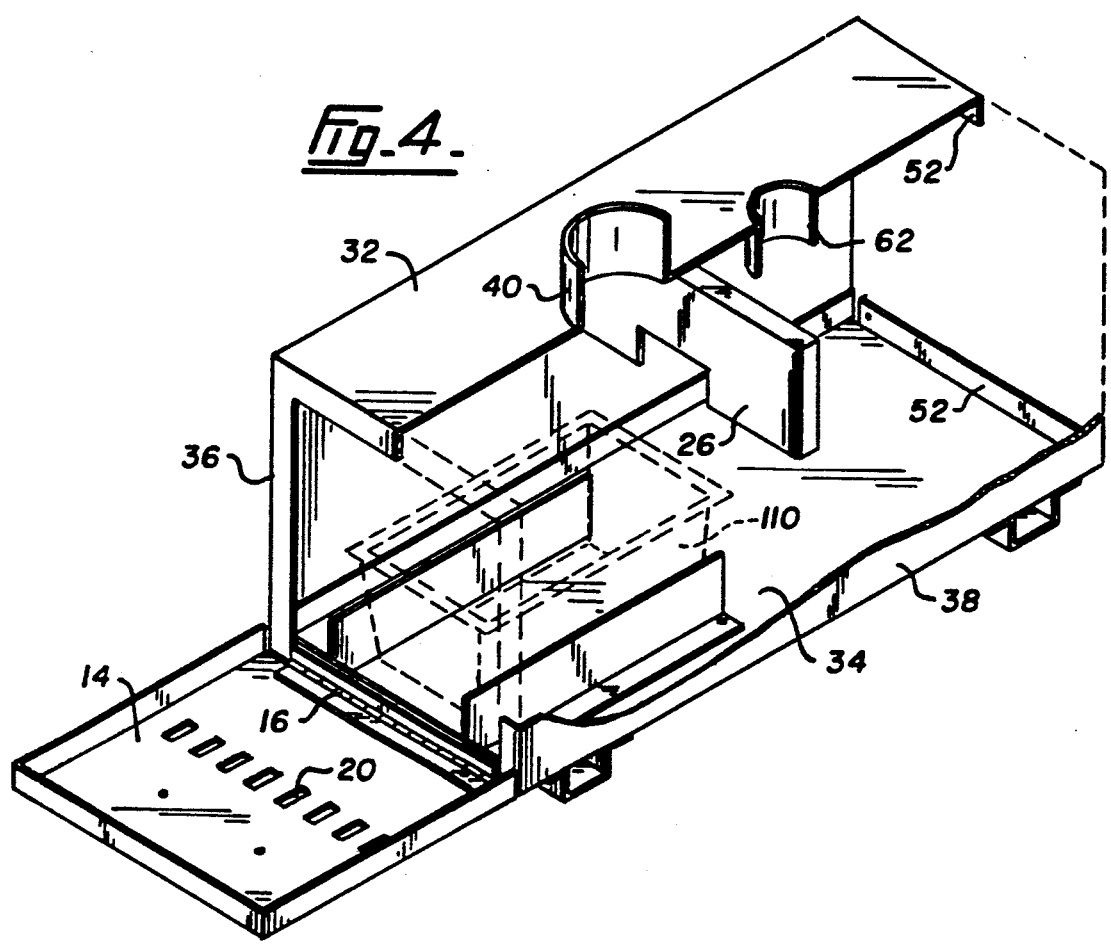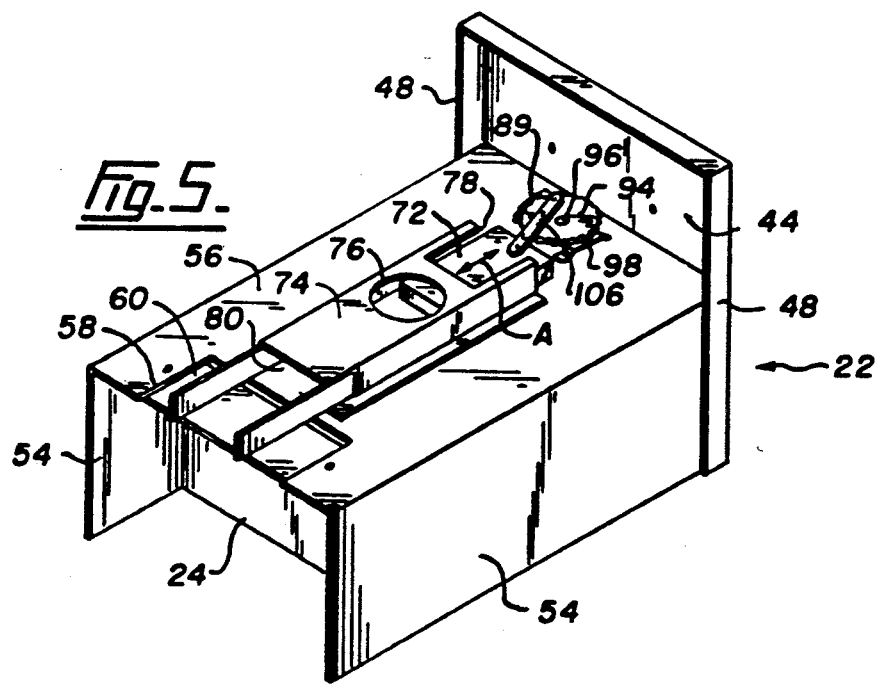

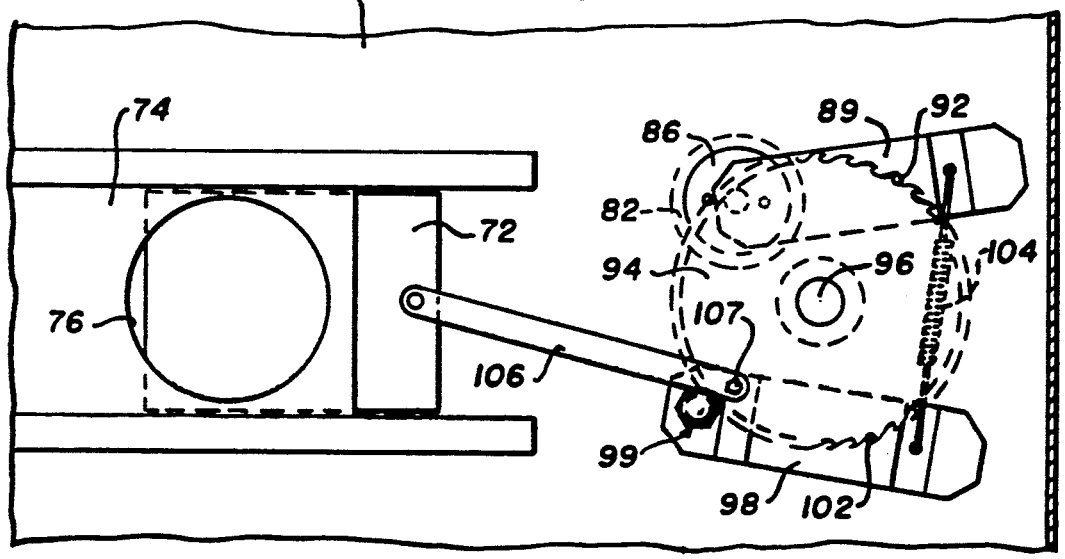
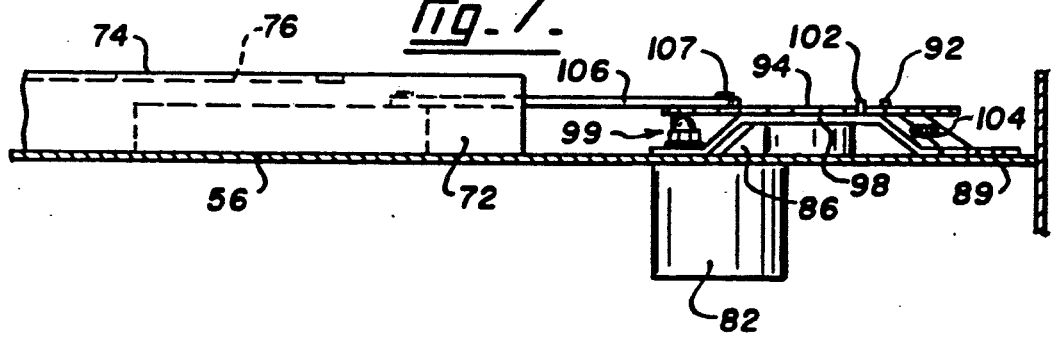

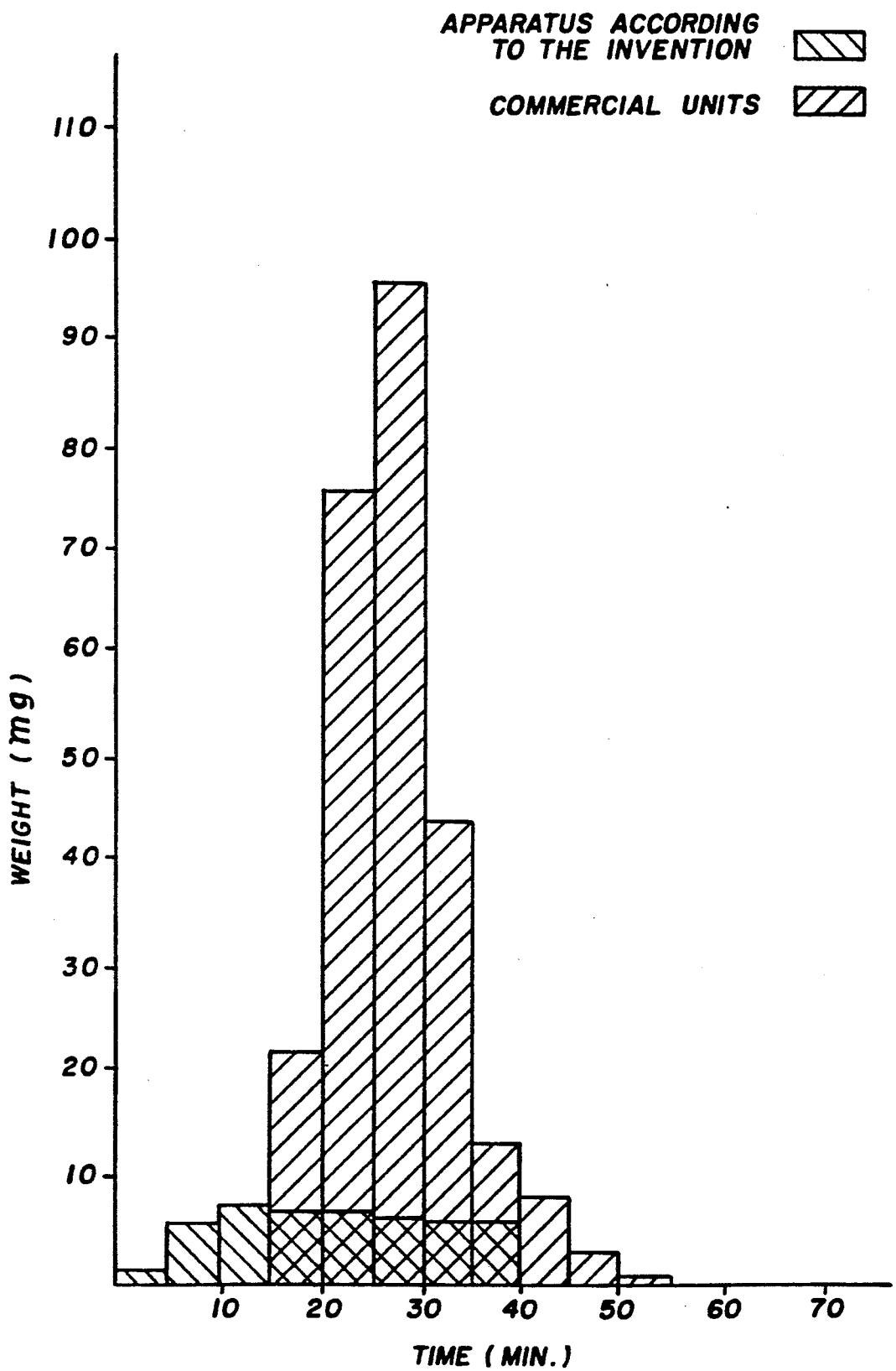

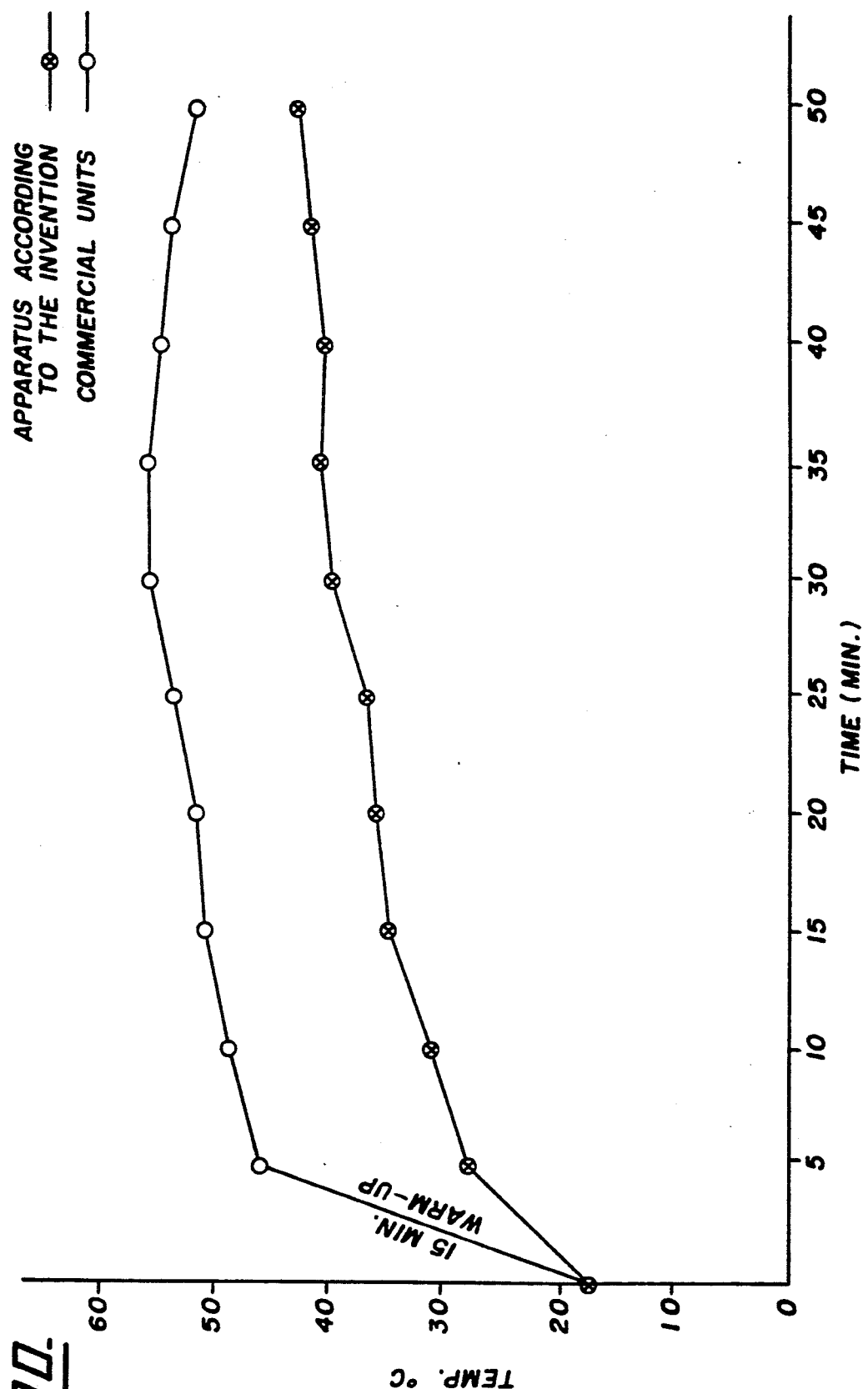

SMOKER APPARATUS

CROSS-REFERENCE TO RELATED APPLICATION

This is a continuation-in-part of Ser. No. 214,049, filed Jun. 30, 1988, now abandoned.

FIELD OF THE INVENTION

The present invention relates to a smoke generating apparatus for use in the smoking of food, for example fish and meat for human consumption.

DESCRIPTION OF THE PRIOR ART

Various apparatuses have, in the past, been proposed for the smoking of food. For example, U.S. Pat. No. 4,175,484, issued Nov. 27, 1979 to Frederic S. Tobey, discloses a smoking apparatus having a container for a stack of hardwood pieces and a drive chain below the stack with pusher members for displaying the successively lowermost hardwood pieces from the bottom of the stack onto a heating element.

Reference is also made, in this connection, to U.S. Pat. Nos. 1,447,401; 2,677,038; 4,175,484 and 4,232,597.

SUMMARY OF THE INVENTION

It is an object of the present invention to provide a novel and an improved smoke generating apparatus with briquette feed mechanism adaptable to provide different rates of feeding.

Accordingly, the present invention provides a smoke generating apparatus comprising a housing defining a heating chamber therein. Pusher means in the form of a reciprocatable slide member are provided for feeding the briquettes in succession to heating means, which are provided in the heating chamber for heating the solid fuel briquettes to produce smoke. A pawl and ratchet mechanism for driving the slide member is readily adjustable replaceable for changing the rate of advance and retraction of the slide member.

More particularly, the ratchet is in the form of a ratchet wheel and the pawl is mounted on an arm which is eccentrically connected to a drive shaft. The eccentricity of the connection between the pawl and the drive shaft can be readily varied to correspondingly vary the "throw" of the pawl and, thus, the rate of rotation of the pawl.

DESCRIPTION OF THE DRAWINGS

Further features, objects and advantages of the invention will appear from time to time from the following description thereof taken in conjunction with the accompanying drawings, in which:

FIG. 1a shows a view in perspective of a fuel briquette for use in the apparatus of FIG. 1;

FIG. 4 shows a view in perspective of parts of the apparatus of FIG. 1, with portions thereof broken-away to reveal the interior of the apparatus;

FIG. 5 shows a view in perspective of a drawer and a slide mechanism mounted thereon, the drawer and slide mechanism forming parts of the apparatus of FIG. 1;

FIGS. 6 and 7 show a plan view and a side view, respectively, of a drive mechanism of the apparatus of FIG. 1;

FIG. 9 shows a comparison of particulate emissions using a briquette according to the present invention, used on the apparatus of the present invention, in comparison with particulate emission from a commercial unit using similar sawdust, but with the sawdust being burnt loose, i.e. in bulk, in an open pan; and FIG. 10 shows a graph which relates the temperature produced in the apparatus according to the present invention, using a briquette according to the present invention, in comparison with a commercially available unit using an identical but (bulk) loose wood composition.

DESCRIPTION OF THE PREFERRED EMBODIMENTS

Figure 1:
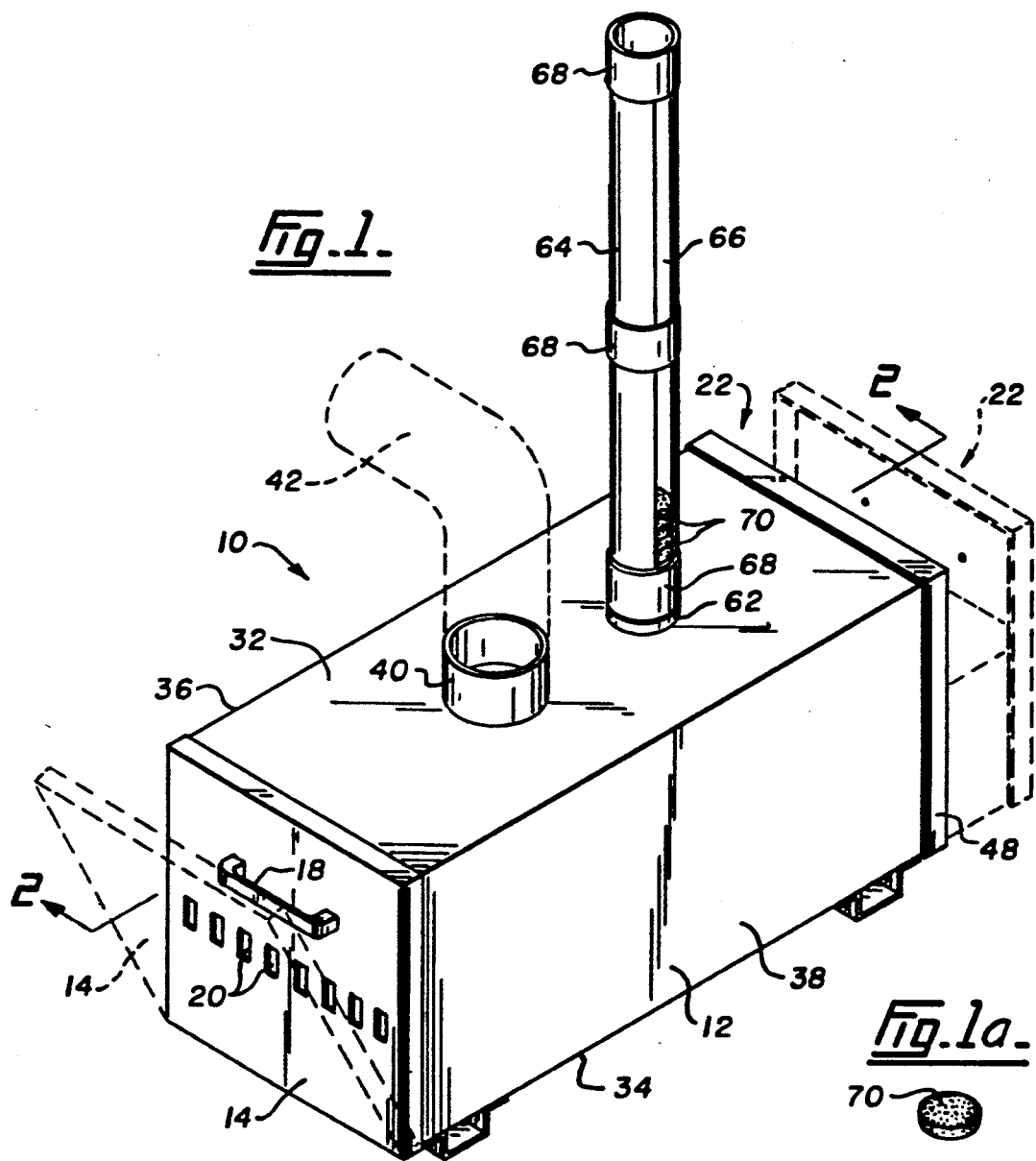
FIG. 1 shows a view in perspective of a smoke generating apparatus according to the present invention.

Referring now to FIG. 1, the smoke generating apparatus illustrated therein is indicated generally by reference numeral 10, and comprises a sheet metal housing 12 of rectangular cross-section, which is provided at one end thereof with a door 14 secured, by means of a hinge 16 (FIG. 4) at the lower edge thereof, to the housing 12. The door 14 is pivotable to and fro in a vertical plane, about the hinge 16, and is provided with a handle 18 to facilitate such pivotation of the door 14. Also, a plurality of air inlet openings 20 are formed in the door.

At the opposite end of the housing 12, there is provided a slide mechanism drawer, which is illustrated greater detail in FIG. 5, and indicated generally by reference numeral 22.

The drawer 22 is slid longitudinally into its respective end of the housing 12, and can be withdrawn therefrom, as shown in broken lines in FIG. 1.

Within the housing 12, a sheet metal wall 24 forming part of the drawer 22, and a sheet metal partition wall 26 located above the wall 24 divide the interior of the housing 22 into a heating chamber 28 and a rear chamber 30.

Figure 2:
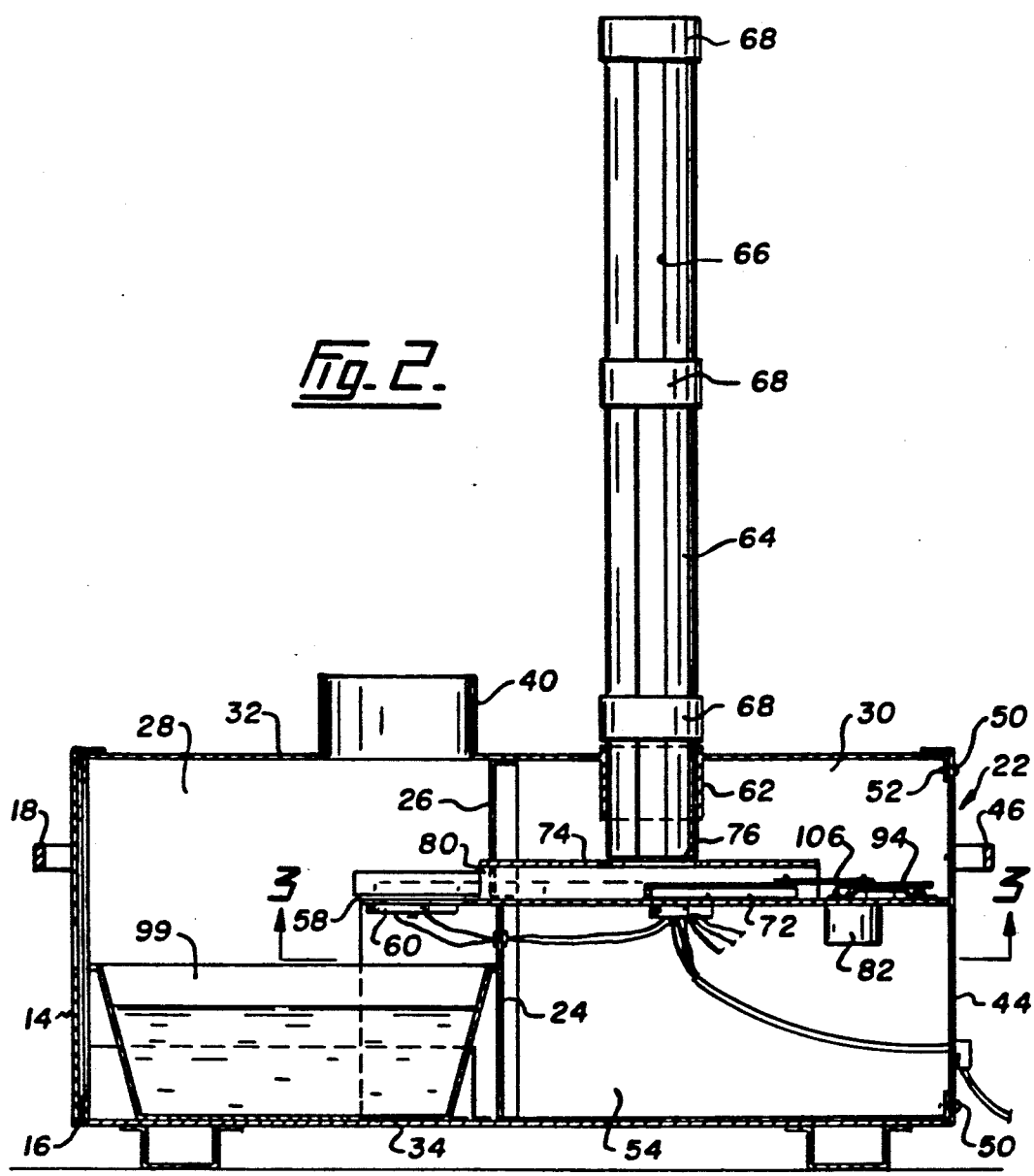
FIG. 2 shows a view taken in longitudinal cross-section through the apparatus of FIG. 1.

More particularly, the heating chamber is defined by the walls 24 and 26, which are disposed substantially in vertical alignment with one another as shown in FIG. 2, by a top 32, a bottom 34 and opposed side walls 36 and 38 of the housing 12, and by the door 14.

A vertical tube 40 projecting upwardly from the top 32 of the housing 12 and communicating with the heating chamber 28 forms a smoke outlet for the outflow of smoke from the apparatus 10, and this tube 40 may be connected by any suitable ducting, such as a smoke duct 42 shown in broken lines in FIG. 1, to a smoke chamber (not shown), in which food is placed so as to be smoked by the smoke produced by the apparatus 10.

The drawer 22 has an end wall 44, provided with a handle 46 for facilitating withdrawal of the drawer 22 from the housing 12, the wall 44 also being provided with flanges 48 which engage over the exterior of the housing 12 and are secured to the housing 12 by screws 50 engaged in inturned flanges 52 on the housing 12.

The drawer 22 also includes a piece of sheet metal which is bent to form parallel side walls 54, which extend along and adjacent the side walls 36 and 38 of the housing 12, and a horizontal deck 56 extending between the side walls 54. The side walls 54 and the deck 56 project beyond the wall 24, and thus project into the heating chamber 28, as shown in FIG. 2, and the end of the deck 56 which projects into the heating chamber 28 is formed with a rectangular cut-out 58. A resistance heating element 60 is secured by screws to the underside of the deck 56 beneath the cut-out 58.

A sleeve 62 extends vertically downwardly through the top of 32 of the housing 12 and receives therethrough the lower end of a vertical tube 64, which is formed with a longitudinal slit 66 and retained by three cylindrical sleeves 68 extending around the exterior of the tube 64.

The tube 64 serves to receive a vertical stack of fuel briquettes 70, which are visible to the user through the slit 66 and one of which is illustrated in FIG. 1a, from which it can be seen that the illustrated briquette is disk-shaped.

On top of the deck 56 of the drawer 22, there is provided a briquette pusher means in the form of a rectangular slide member or piston 72, which is slidable to and fro in opposite directions indicated by the double arrow A. This motion of the slide member 72 is guided by a sheet metal guide 74, which is secured to the drawer deck 56 and which is provided with a circular opening 76 intermediate rectangular cut-outs 78 and 80 at opposite ends of the guide 74.

The circular opening 76 is disposed directly beneath the tube 64, when the drawer 22 is secured in housing as shown in FIG. 2, so as to receive the briquettes 70, which drop one by one through the opening 76 onto the deck 56, along which they are pushed by the slide member 72 towards the heater 60. When each of the briquettes in succession rests on the heater 60 and the latter is energized, so that the briquette on the heater 60 emits smoke, the cut-out 80 facilitates flow of the smoke in an upward direction from the briquette on the heater 60 towards the outlet opening defined by the tube 40.

Figure 3:
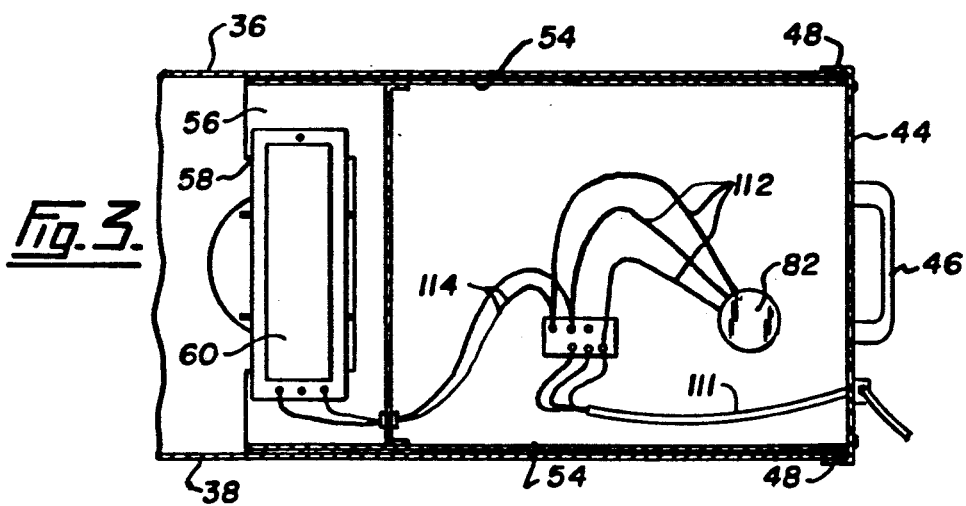
FIG. 3 shows a broken-away view taken in cross-section along the line 3—3 of FIG. 2.

The slide member 72 forms part of a briquette feeding mechanism which is driven by a drive motor indicated generally by reference numeral 82 in FIG. 3, the drive motor 82 being secured to the underside of the deck 56.

Figure 8:
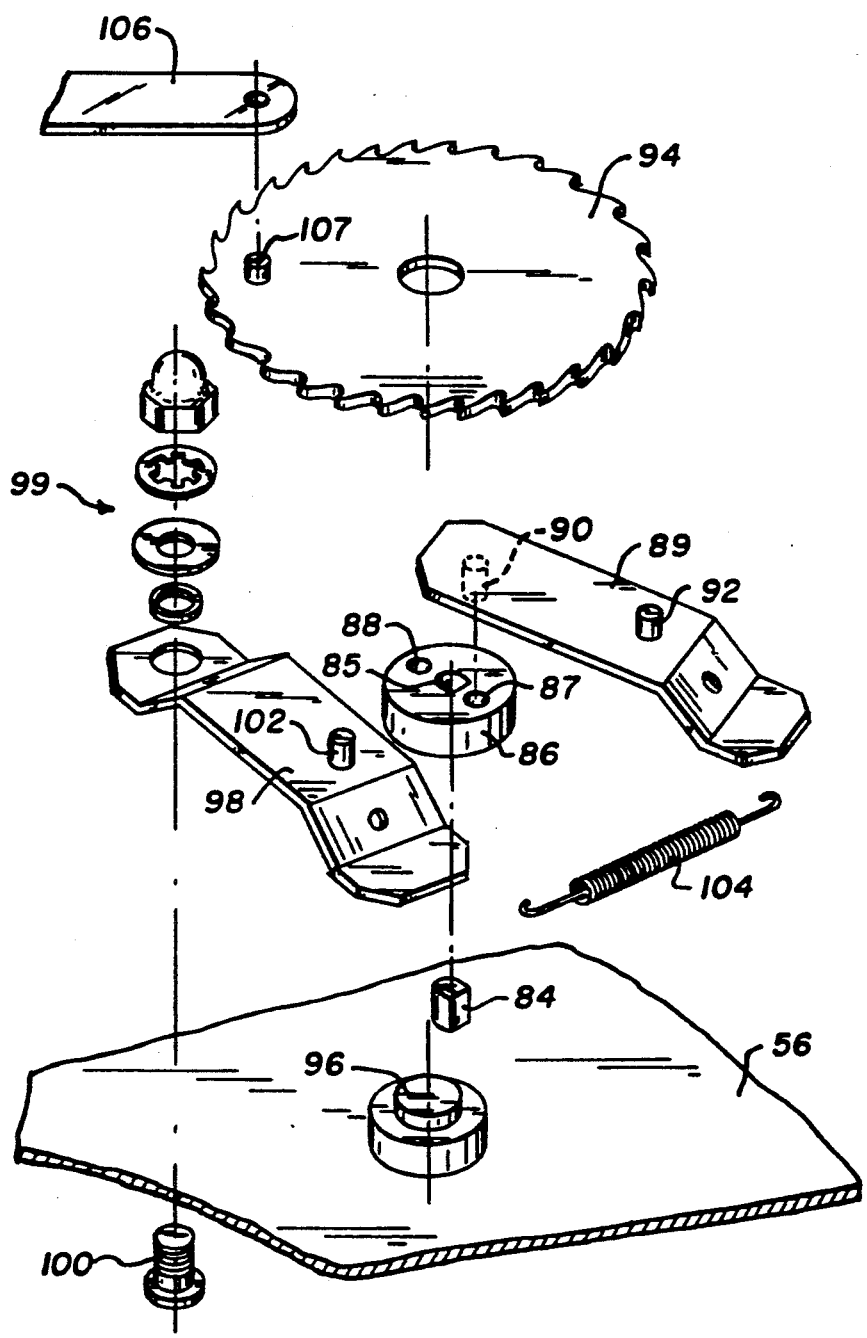
FIG. 8 shows an exploded view of the drive mechanism of FIGS. 6 and 7.

The drive motor 82 has an output shaft 84 which extends upwardly through the deck 56 and which is formed at its upper end with a D-shaped cross-section, as can be seen in FIG. 8. This upper end of the drive shaft 84 engages in a correspondingly D-shaped opening 85 in a circular rotatable member in the form of a disk 86, so that rotation of the drive shaft 84 by the drive motor 82 will cause the disk 86 to rotate eccentrically about the axis of rotation of the drive shaft 84.

The disk 86 is formed with two holes 87 and 88, which are of circular cross-section and which have different spacings from the axis of rotation of the disk 86. An arm 89 has, at one end, a downwardly projection cylindrical pin 90, which is selectively and rotatably engagable in either of the holes 87 and 88.

A vertical upwardly projecting pin 92 on the arm 89 engages as a pawl in the teeth of a ratchet wheel 94, which is rotatably mounted on a shaft 96 extending upwardly from the deck 56.

The end of the arm 89 remote from the pin 90 is stepped downwardly to rest slidably on the deck 56.

A further arm 98 is pivotably mounted at one end on a pivot 100 extending upwardly through the deck 56 and carries a vertically upwardly extending pin 102 which also engages in the teeth of the ratchet wheel 94. The arm 98 has downwardly stepped opposite ends which rest on the deck 56 and is rotatably secured to the pivot 100 by a nut and washer set indicated generally by reference numeral 99.

A helical tension spring 104 is connected between the arms 90 and 98 so as to resiliently bias the pins 92 and 102 towards the ratchet wheel 94. A lever 106 pivotably connected to the ratchet wheel 94 by a pivot pin 107 and also to the slide member 72 transmits drive from the former to the latter.

More particularly, as the disk cam 86 rotates as described above, the pin 90 is correspondingly displaced in a circular motion about the axis of the drive shaft 84 and the pin 92 is consequently displaced to and fro, relative to the periphery of the ratchet wheel 94. The pin 92 is thus caused to engage the teeth of the ratchet wheel 94, thereby causing the ratchet wheel 94 to rotate in a stepped manner in an anticlockwise direction as viewed from above. Meanwhile, the pin 102 also engages the teeth of the ratchet wheel 94 so as to prevent rotation of the latter in the opposite direction.

The lever 106 acts as a connecting rod to convert the stepped rotation of the ratchet wheel 94 into stepped linear reciprocation of the slide member 72.

The pin 90 can be readily disengaged from the hole 87 and inserted into the hole 88, and vice versa, so as to correspondingly vary the spacing, i.e. the eccentricity, of the pin 90 relative to the axis of rotation of the disk 86. In this way, the "throw" of the pawl pin 92 can be correspondingly varied to cause the pin 92 to engage every second or every third tooth of the ratchet wheel 94. The rate of rotation of the ratchet wheel 94, and thus the rate of advance of the briquettes can thus be selectively varied. This enables the briquette feed mechanism to be readily adapted to different sizes of the smoke generating apparatus.

By these means, the slide member 72 is advanced in a stepped motion towards the heater 60 so that a briquette pushed forwardly by the slide member 72 is advanced in steps onto the heater 60 and, thus, consumed in successively heated portions. The slide member 72 is then returned to allow the next briquette to drop from the stack in the tube 64.

As the consumed briquettes are successively advanced and discharged from the heater 60 by oncoming unburned briquettes, they fall into an extinguishing bath of water in a pan, shown in FIGS. 2 and 4. The remnants of the consumed briquettes are thus prevented from further charcoaling and from producing unwanted and unregulatable heat and emissions.

The drive motor 82 is energized by an electrical mains current connected by a lead 111 and conductor 112 to the drive motor 82, and current from the lead 111 is also supplied by conductors 114 to the heater 60 for energizing the latter.

The briquette illustrated in FIG. 1a was produced in a mould. Approximately 13 grams of wood particles of a desired wood, for example hickory, alder or mesquite, were mixed with 1 gram of a colloid binder available under the trade mark Feed Binder from Swift Adhesives. The compositions were mixed dry. The wood particles were first passed through a sieve having seven wires per inch, mixed with the binder and then placed within the mould able to form a generally small, flat disk as shown in FIG. 1a. Pressure was applied in the mould and the colloid and wood was subjected to a pressure of about 75 to 100 lbs. per square inch at a temperature of about 450° F. for 45 seconds.

The resulting briquettes were then used to generate smoke and the smoke output and output of organic compounds was measured as function of time and compared with a prior art unit. The objective of this investigation was to evaluate a food smoking unit according to the present invention with respect to production total particulates on organic matter, nitric oxide and carbon monoxide and to compare these values to those of a commercially food smoking unit available under the trade mark Little Chief (by Luhr Jensen & Sons Inc.). This investigation was followed by a study of the emissions of total particulates, including organic matter, as a function of time for an apparatus according to the present invention and comparing those values to those of a commercial unit.

EXPERIMENTAL PROCEDURE

General

Optimum operating conditions for the apparatus of the present invention and for the commercial unit were determined. The apparatus of the present invention was operated by placing several pre-pressed sawdust pellets into a feeding device located on the side of the unit. Each pellet (weighing approx. 14 g each) was sequentially placed on a burner by the automatic feeding device.

The commercial unit was operated by placing pre-weighted loose sawdust of the same type and size so as to be identical with that used to manufacture prepressed pellets (60 g) on a pan and heating on a hot plate at a rate such that a slow burn would occur. The hot plate and pan were placed at the bottom of the food compartment.

Food products were not placed in the units during these experiments. The doors in both units were closed during the tests.

Gas monitors were placed in the stack gas exhaust of each unit as required. Measurements for gases and particulates were conducted as each unit was in operation. A warm-up time was allowed for each unit (normally less than 15 min.). Sampling was started upon the first indication of visible smoke.

Temperature measurements were conducted by means of a calibrated thermocouple device.

Preliminary Study

Sampling for particulates was conducted by using a Lear-Siegler PM-100 stack sampling train placed in the exhaust duct on top of each unit. Probes were placed through a 2" hole and sealed with high temperature tape. This exhaust duct was used for both the apparatus of the invention and the commercial unit.

Monitors for carbon monoxide and nitric oxide were similarly placed at the above location. Operating conditions for the two units were as described under general experimental procedure.

Emission of Particulates and Organics as a Function of Time

Several attempts to measure the rate of particulate emissions using a particle counter were not successful. Similarly, attempts to use particulate filtering techniques to evaluate emissions as a function of time did not work due to severe plugging of the filters.

Thus, to sample particulate matter and organics, a sampling system for collecting *total* particulate emissions was installed as follows: a large inverted funnel was placed directly over the flue gas exit on top of the unit. The funnel was sealed by adhesive tape over the exit and connected by a short piece of tubing to two pre-weighted 30 ml midget impingers connected in series. The impingers were then connected to the suction side of a vacuum pump. During sampling, the impingers were placed in a ice-salt bath in order to minimize loss of material. The sampling rate was adjusted such that the pump flow rate was approximately equal to the emission rate from each unit.

During each run, impinger samples were collected every 5 minutes for the duration of the run (approx. 45 min.). The content of each pair of impingers (5 min. sampling) were oven dried (60° C., 16 h) and then placed a desiccator to constant weight. The weight of sample collected was determined by re-weighing each preweighted impinger. The weight of total collected particulate and organics collected for each 5 minute run was obtained and tabulated table 2).

Extraction of Organics

Samples of material collected in the impingers used to collect particulates from the apparatus of the present invention were placed in an slightly acidified water mixture and extracted separately using n-hexane or 1,1,2-trichloro-1,1,2-trifluoro ethane available under the trade mark Freon. The viscous material was found to be insoluble in these organic solvents.

Moisture Content

The relative moisture content of the sawdust pressed pellets and of the loose sawdust was determined gravimetrically after heating the samples at 105° C. to constant weight (approx. 18 h). Moisture content was as follows:

Pressed pellets: 7.2%
Loose sawdust: 7.6%

Organic Acids and other Alkali Reactive Substances

Samples of material collected in the impingers (approx. 30 mg) were placed in a small volume of water (5 ml) and heated to 80°–85° C. This was allowed to cool to room temperature and titrated using 0.05N sodium hydroxide. Flue gas material from the apparatus of the present invention consumed 1.26 milliequivalents alkali per gram of material. Impinger material from the commercial unit consumed 1.17 milliequivalents/gram. Expressed as benzoic acid equivalents, this translates into 153 mg/g for the apparatus of the present invention and 142 mg/g for the commercial unit.

DISCUSSION

Preliminary Study

The results of the two preliminary tests on an "as is" basis is shown in Table 1. It is recognized that because the two burning systems are quite different, comparisons are not made using strictly identical parameters (e.g. operating.temp., etc. may be different). Table 1 indicates that the weight of particulate matter collected for the commercial unit was 3.67 g (71.3 cu.ft. flue gas sampled) compared with 0.66 g (74.9 cu.ft. flue gas collected) for the apparatus of the present invention. The observed burning rates for the two units was substantially different. The commercial unit produced a large amount of particulate matter over approximately a 25 minute period and then slowed down drastically. The apparatus of the present invention appeared to produce "smoke" at a steady rate during the test period.

Quantitative determination of the rate of particulate emissions was not conducted as part of the preliminary study.

The concentration of carbon monoxide and nitric oxide in the two units did not appear to be significantly different (Table 1).

Emissions of Particulates and Organics as a Function of Time

The emission of total particulate and organic matter (equivalent to total "smoke") produced by each of the units is shown in Table 2. For the apparatus of the present invention during normal operating weight of material produced for each 5 minute interval is consistently between 0.03 and 0.04 grams (30–40 mg).

The commercial unit was much more variable, with most of the combined emissions being produced during the middle of the run. For each 5 minute period, the weight of material obtained ranged from approx. 0.57 g (at 15 min.) to 0.0062 g at (40 min.). Almost a 100 fold variability. The total amount of particulates and organic material produced by the apparatus of the present invention is substantially lower (0.25 g) than that produced by the commercial unit (1.18 g) at the operation conditions used.

It is thus evident that the apparatus of the present invention produced total particulate matter at a highly consistent rate. This is due primarily to the automatic pellet injection system which burns a specific weight of pressed sawdust per unit time.

Table 2b is a tabulation of the values from Table 2, but based on 100 g weight of loose sawdust or pressed pellet. FIG. 1 is a graphical representation of these values. Inspection of FIG. 1 clearly indicates that the apparatus according to the invention produces total particulates at a highly consistent rate.

The concentration of carbon monoxide, nitric oxide and nitrogen dioxide is shown in Table 3. The date indicates that during the runs, relatively similar concentration of carbon monoxide and nitric oxide were found for both units. The amount of nitrogen dioxide produced by the apparatus of the invention was somewhat lower than that produced by the commercial unit.

During the test experiments, the emissions produced by the commercial unit were more viscous and appeared more wet. This is likely due to the higher moisture content of loose sawdust.

Temperature Variability

Table 4 indicates the temperature changes in each unit during the run. This is also shown in FIG. 2. The apparatus of the present invention thus produced lower temperatures under the experimental conditions used.

TABLE 1

|  | Commercial Unit | Invention |
|---|---|---|
| Wt. Sawdust Burned (g) | 114 g(loose) | 45 g(cake) |
| Wt. Particulate collected (g) | 3.67 | 0.56 |
| Volume flue gas collected (ft3) | 71.3 | 74.9 |
| Temp. of (food compartment) | 151–183 | 82–124° |
| Running time (hours) | 2 | 2 |
| Carbon Monoxide (ppm) | 0.2–0.4 | 0.1–0.3 |
| Nitric Oxide | .6–2.3 | 0.8–2.8 |

TABLE 2

EMISSION OF COMBINED PARTICULATE AND ORGANIC MATTER AS A FUNCTION OF TIME

| Time(min.) | Wt(g) Commercial Unit | Wt(g) Invention |
|---|---|---|
| 5 | .0077 | .1344 |
| 10 | .0317 | .4596 |
| 15 | .0396 | .5765 |
| 21 | .0395 | .2574 |
| 25 | .0377 | .0824 |
| 30 | .0323 | .0490 |
| 35 | .0308 | .0174 |
| 40 | .0310 | .0062 |
| Total | .2503 | 1.1793 |

Initial Wt. used: Apparatus of the present invention: 53 g (approx. 3½ cakes Commercial unit: 60 g (loose sawdust)

TABLE 2b

EMISSION OF COMBINED PARTICULATE AND ORGANIC MATTER AS A FUNCTION OF TIME (100 g basis)

| Time(min.) | Wt(g) Invention | Wt(g) Commercial Unit |
|---|---|---|
| 5 | .0145 | .2230 |
| 10 | .0598 | .7624 |
| 15 | .0751 | .9564 |
| 20 | .0745 | .4436 |
| 25 | .0711 | .1367 |
| 30 | .0609 | .0813 |
| 35 | .0581 | .0289 |
| 40 | .0585 | .0103 |

TABLE 3

NITRIC OXIDE AND NITROGEN DIOXIDE IN FLUE GAS

| | CONCENTRATION (PPM) | |
|---|---|---|
| | Invention | Commercial Unit |
| Carbon Monoxide | 200–550 | 100–600 |
| Nitric Oxide | .02–1.3 | 0.6–1.0 |
| Nitrogen Oxide | Less than .05 | 0.1–0.2 |

TABLE 4

TEMPERATURE VS. RUNNING TIME

| Time (min.) Invention | Commercial Unit | Temperature °C. |
|---|---|---|
| 0 | 18 | 18 |
| 5 | 46 | 28 |
| 10 | 49 | 31 |
| 15 | 51 | 35 |
| 20 | 52 | 36 |
| 25 | 54 | 37 |
| 30 | 56 | 40 |
| 35 | 56 | 41 |
| 40 | 55 | 41 |
| 45 | 54 | 42 |

We claim:
1. Smoke generating apparatus, comprising:
a housing defining a heating chamber therein;

means in said heating chamber for heating solid fuel briquettes to produce smoke from said briquettes;

means for supporting a stack of briquettes; and means for feeding said briquettes one at a time in succession from the bottom of said stack to said heating means;

said briquette feeding means comprising;

pusher means for pushing said briquettes from said stack to said heating means;

means for advancing and retracting said pusher means relative to said heating means;

means for driving said advancing and retracting means; and adjustment means for adjusting said advancing and retracting means to vary the rate of advance of said means towards said heating means.

2. Smoke generating apparatus as claimed in claim 1, wherein said advancing and retracting means comprise pawl and ratchet means for converting rotary motion of said drive means into stepped displacement of said pusher means relative to said heating means.

3. Smoke generating apparatus as claimed in claim 2, wherein said adjustment means comprise a rotatable member mounted for rotation by said drive means, said pawl and ratchet means comprising a rotatable rachet wheel and a pawl, said pawl engaging the teeth of said ratchet wheel, and means being provided for selectively connecting said pawl to said rotatable member at different spacings from the axis of rotation of said rotatable member.

4. Smoke generating apparatus as claimed in claim 3, further comprising stop means for retaining said ratchet wheel against reverse rotation, means supporting said stop means for movement relative to said ratchet wheel so as to allow disengagement of said ratchet wheel and said stop means on rotation of said ratchet wheel and tension spring means connected between said stop means and said for resiliently urging said stop means and said pawl towards said ratchet wheel.

5. Smoke generating apparatus as claimed in claim 1, further comprising means defining a water containing receptacle at a location below the level of said heating means for receiving used briquettes from said heating means, said briquette feeding means comprising means for displacing said briquettes onto and beyond said heating means and thereby into said receptacle for extinguishing said briquettes.

* * * * *